UNITED STATES PATENT OFFICE.

ALFRED NOBEL, OF HAMBURG, GERMANY, ASSIGNOR, BY MESNE ASSIGNMENTS, TO THE GIANT-POWDER COMPANY, OF SAN FRANCISCO, CAL.

IMPROVEMENT IN EXPLOSIVE COMPOUNDS.

Specification forming part of Letters Patent No. 78,317, dated May 26, 1868; reissue No. 5,619, dated October 21, 1873; application filed October 14, 1873.

*To all whom it may concern:*

Be it known that I, ALFRED NOBEL, of the city of Hamburg, in the Empire of Germany, have invented an Improved Explosive Compound, of which the following is a specification:

This invention relates to a new and useful combination or mixture of nitro-glycerine with some absorbent substance, whereby the condition of the nitro-glycerine is so modified as to render the resulting explosive compound more practically useful and effective as an explosive, and far more safe and convenient for handling, storage, and transportation than nitro-glycerine in its ordinary condition as a liquid. The invention consists in combining or mixing with nitro-glycerine some porous or absorbent substance, which, being free from any quality which will cause it to decompose, destroy, or injure the nitro-glycerine, forms, in combination with it, an explosive compound possessing certain marked properties of great practical utility, which not only increase its efficiency but also obviate many of the serious practical objections to the employment of nitro-glycerine as an explosive. Some of these peculiar properties of this mixture will be briefly stated.

Nitro-glycerine being a liquid, it is usually necessary, in exploding it as an explosive for blasting purposes, to place it in cases or cartridges formed of paper, metal, or other substance, which must, of course, be of somewhat smaller diameter than the bore-holes, as, if not so inclosed, the nitro-glycerine would permeate the seams of the rock and prove highly dangerous to the miner, on account of its liability to explode in subsequent drillings; but by means of this invention the nitro-glycerine, being held in combination with the porous or absorbent substance with which it is mixed, and then assuming the altered form of a powder or paste, remains in the bore-hole in which it is placed without leaking through the seams of the rock.

Another advantage over liquid nitro-glycerine is, that this mixture can be made to fill the bore-hole more closely than a cartridge-case will, owing to the irregularities of shape of the hole, which greatly increases its efficiency. The liability of fluid nitro-glycerine to accidental explosion from agitation or concussion renders its handling and transportation very dangerous. This danger is, however, almost entirely obviated by the use of the compound described in this specification, because when mixed with a suitable absorbent the nitro-glycerine is far less sensitive to shocks than when in a liquid condition, so that it may be handled in mass, either loose or in packages, with impunity. So much is this the case that when this mixture is packed in a wooden case or box the inclosure may be knocked to pieces without danger of exploding its contents.

This invention, then, consists in mixing liquid nitro-glycerine with some solid (as distinguished from liquid or fluid) substance which will absorb and retain a sufficient amount of nitro-glycerine to form an efficient explosive. The substance which is believed to be the best adapted for this purpose is a kind of silicious earth, found in various parts of the globe, and known by the various names of silicious marl, tripoli, and rotten stone. The peculiar variety of this material best suited for this use is homogeneous, has a low specific gravity, and great absorbent capacity, and is generally composed of the remains of infusoria. So great is the absorbent capacity of this infusorial earth that when in a pulverized condition it will take up about three times its own weight of liquid nitro-glycerine, and still retain the form of a powder. Other porous substances, even though they have less absorbent capacity, may be used, but in this case the explosive strength of the powder will be diminished owing to the smaller proportion of nitro-glycerine contained therein. Chalk, for example, will absorb about fifteen per cent. of nitro-glycerine and retain its powdered condition; and porous charcoal, although of greater absorbent capacity, has less elasticity of particles, so that the nitro-glycerine is apt to squeeze out of it. Any of the various vegetable or mineral substances susceptible of pulverization or comminution, and which will retain nitro-glycerine by absorption, may be substituted for infusorial earth.

The relative proportion of the ingredients used in making this new explosive compound will vary according to the absorbent capacity of the substance mixed with the nitro-glycerine, it being preferable in all cases, and this is the only limit, to use so much only of the liquid nitro-glycerine as the absorbent substance will retain without liability to subsequent separation by compression or leakage. Where the absorbent used in a powdered condition is infusorial earth, a thin paste or semi-fluid condition of the mixture is to be avoided.

The method of making this new explosive compound with infusorial earth is as follows: The earth, being first thoroughly dried and pulverized, is placed in any suitable vessel, and the nitro-glycerine is then gradually introduced and thoroughly mixed with the powdered earth, which is effected either by stirring with the naked hand or by means of any suitable wooden instrument, worked either by machinery or by hand. Where infusorial earth is used the proportions may be conveniently varied, from sixty parts, by weight, of liquid nitro-glycerine, and forty parts, by weight, of infusorial earth, to seventy-eight parts, by weight, of nitro-glycerine and twenty-two parts, by weight, of infusorial earth, the former proportions forming, at ordinary temperatures, a dry pulverulent mass, and the latter a pasty mixture. These proportions may, however, be varied outside of the limits above stated, it being observed that the explosive force of the mixture is increased where a larger proportion of nitro-glycerine is employed, and that when the mixture is to be used in a cold climate a larger quantity of nitro-glycerine may be safely employed than when it is to be exposed to a warmer atmosphere. For ordinary practical purposes a mixture of seventy-five parts, by weight, of nitro-glycerine and twenty-five parts, by weight, of infusorial earth, gives a powder sufficiently dry at ordinary temperatures, and which is susceptible of compression to a specific gravity nearly equal to that of pure nitro-glycerine.

When the ingredients have been intimately mixed and thoroughly incorporated by stirring and kneading, the compound may be rubbed through a sieve made of hair, silk, or brass-wire, and any lumps which remain may be powdered by rubbing them through the sieve with a stiff-bristle brush. The powder is then ready for use, and may be packed in bulk in boxes, or compressed into cartridge-cases made of paper, of such convenient sizes as may be most in demand for blasting purposes. A greater or less degree of fineness of grain may be given to the powder by using a fine or coarse sieve.

In using this improved explosive compound for blasting, it may be inserted into cartridge-cases, as above stated, or without any inclosure or wrapping, as may be preferred. For the best effect it should be pressed firmly down so as to fill the bore-hole, whether in cartridge or not, a small quantity at a time with a wooden rod until it is firmly packed. If the cartridges are smaller than the bore the pressure will burst them, and allow the powder to spread laterally and fill the bore. It may be easily and efficiently exploded by means of an ordinary blasting-fuse inserted into the open end of a percussion-cap, the metallic edges of the cap being compressed or crimped tightly and firmly around the fuse, so as to hold it in place, with the end of the fuse in close contact with the fulminate in the percussion-cap. The capped end of the fuse is then inserted into the explosive powder, which is pressed closely around it in the bore-hole, and a tamping of sand or other suitable material may be placed above the charge of powder and pressed down upon it.

The fuse thus applied is fired in the ordinary manner, and when the fire reaches the percussion-cap it explodes, which effects the immediate explosion of the charge of explosive compound. It is better to use a percussion-cap having a heavy charge of fulminate, in order to insure an explosion of the powder, although under favorable circumstances it might be exploded with an ordinary fuse without any cap; but this method is too uncertain to be relied upon.

For ordinary blasting, the bore-holes may be about one-half the size, and the charge of explosive compound about one-fifth the quantity that would be made use of when gunpowder is used as the explosive.

What we claim as the invention of ALFRED NOBEL, and desire to secure by Letters Patent in the name of THE GIANT-POWDER COMPANY and THE ATLANTIC GIANT-POWDER COMPANY, as assignees (through mesne assignments) of the said ALFRED NOBEL, is—

The combination of nitro-glycerine with infusorial earth, or other equivalent absorbent substance, as a new explosive compound.

[L. S.] GEO. C. HICKOX,
*President of the Giant-Powder Co.*

Witnesses:
H. PICHOIS,
A. BLACK.